US012620753B2

(12) United States Patent
Takeuchi et al.

(10) Patent No.: US 12,620,753 B2
(45) Date of Patent: May 5, 2026

(54) OUTSIDE PLANT CABLE ADD AND DROP ENCLOSURE

(71) Applicant: Go!Foton Holdings, Inc., Somerset, NJ (US)

(72) Inventors: Kenichiro Takeuchi, North Brunswick, NJ (US); David Zhi Chen, Dallas, TX (US)

(73) Assignee: Go!Foton Holdings, Inc., Somerset, NJ (US)

( * ) Notice: Subject to any disclaimer, the term of this patent is extended or adjusted under 35 U.S.C. 154(b) by 820 days.

(21) Appl. No.: 17/876,942

(22) Filed: Jul. 29, 2022

(65) Prior Publication Data

US 2023/0125728 A1     Apr. 27, 2023

Related U.S. Application Data

(60) Provisional application No. 63/270,283, filed on Oct. 21, 2021.

(51) Int. Cl.
*H01R 13/52*     (2006.01)
*H01R 13/502*    (2006.01)
*H02G 15/00*     (2006.01)

(52) U.S. Cl.
CPC ....... *H01R 13/5208* (2013.01); *H01R 13/502* (2013.01); *H02G 15/00* (2013.01)

(58) Field of Classification Search
CPC .. H01R 13/5208; H01R 13/502; H02G 15/00; G02B 6/4454; G02B 6/44785; G02B 6/44465; G02B 6/44775; G02B 6/44515; G02B 6/4444; G02B 6/44528
See application file for complete search history.

(56) References Cited

U.S. PATENT DOCUMENTS

| | | | |
|---|---|---|---|
| 7,756,379 B2 * | 7/2010 | Kowalczyk ......... | G02B 6/4446 |
| | | | 385/135 |
| 2005/0163448 A1 | 7/2005 | Blackwell et al. | |
| 2005/0271344 A1 | 12/2005 | Grubish et al. | |
| 2008/0232743 A1 | 9/2008 | Gronvall et al. | |
| 2008/0285933 A1 * | 11/2008 | Vogel ................ | G02B 6/44528 |
| | | | 385/135 |
| 2011/0013875 A1 * | 1/2011 | Bran de Leon .... | G02B 6/44526 |
| | | | 385/135 |
| 2011/0091170 A1 * | 4/2011 | Bran de Leon .... | G02B 6/44524 |
| | | | 385/100 |
| 2019/0036316 A1 | 1/2019 | Van Baelen | |

(Continued)

FOREIGN PATENT DOCUMENTS

| | | |
|---|---|---|
| CN | 101424774 A | 5/2009 |
| CN | 107681290 A | 2/2018 |

(Continued)

OTHER PUBLICATIONS

European Search Report issued in Appln. No. 22200812.0 mailed Mar. 21, 2023 (9 pages).

*Primary Examiner* — Travis S Chambers
(74) *Attorney, Agent, or Firm* — Lerner David LLP

(57) ABSTRACT

A cable enclosure including a main portion, a multi-cable terminal secured to the main portion, and a sealing assembly for accommodating at least one cable portion and for providing a watertight seal between the sealing assembly and the at least one cable portion and between the sealing assembly and the main portion.

15 Claims, 19 Drawing Sheets

(56)          References Cited

U.S. PATENT DOCUMENTS

| 2019/0170961 A1 | 6/2019 | Coenegracht et al. |
| 2021/0271043 A1 | 9/2021 | Geens et al. |

FOREIGN PATENT DOCUMENTS

| JP | 2002-040264 A | 2/2002 |
| JP | 2002-056906 A | 2/2002 |
| JP | 2013-113926 A | 6/2013 |
| WO | 2017129815 A1 | 8/2017 |

* cited by examiner

800

850

OUTSIDE PLANT CABLE ADD AND DROP ENCLOSURE

CROSS-REFERENCE TO RELATED APPLICATIONS

The present application claims the benefit of the filing date of U.S. Provisional Patent Application No. 63/270,283, filed Oct. 21, 2021, the disclosure of which is hereby incorporated herein by reference.

BACKGROUND

The increasing deployment of electronic and fiber optic networks has given rise to an increasing need to manage the distribution of signals in such networks. Often, the distribution of signals is managed through the routing of cables associated with the signals and involves the use of multi-cable terminals that allow for selective connection between cables at designated points in a network.

The increasing need to manage signal distribution is particularly acute with respect to fiber optic communications. For example, fiber optic communication signals between individual homes and a fiber network may be implemented through an Outside Plant (OSP) terminal, such as a drop box. In such a system, the terminal may couple a high capacity main cable to a multiple of lower capacity cables so that communication signals for each home may be delivered via the corresponding low capacity dedicated cable. In this manner, there is no need to run a high capacity cable to each home. Moreover, the terminal may be constructed so as to allow cables to be easily connected to the terminal and easily disconnected from the terminal, as dictated by circumstance. For instance, if a home's dedicated cable is damaged the cable may be readily disconnected from the terminal and replaced with a new cable.

BRIEF SUMMARY

In creating the technology described in this disclosure, it was recognized that a desirable feature of multi-cable terminals is an optimized combination of ease-of-use and component protection. Such optimization is among the advantages of the technology.

In accordance with an aspect of the technology described in this disclosure a cable enclosure includes a main portion, at least one a multi-cable terminal secured to the main portion, and a sealing assembly for accommodating at least one cable portion and for providing a watertight seal between the sealing assembly and the at least one cable portion and between the sealing assembly and the main portion.

The multi-cable terminal may comprise at least one sub-structure configured to receive a service cable. The at least one sub-structure may include one or more cable connection elements, a cable seal positioned within the at least one sub-structure, a base, and a lid configured to close against the base. When the service cable is within the at least one sub-structure and the lid is closed against the base, the cable seal may provide a watertight seal around the one or more connection elements. The at least one sub-structure may include a port sealer configured to provide a watertight seal between the at least one sub-structure and the main portion.

The sealing assembly may include at least one gasket for providing the watertight seal between the sealing assembly and the main portion. The sealing assembly may include a first half having a first gasket and a second half having a second gasket, wherein the first half and second half are each configured to be coupled to the main portion. The sealing assembly may further include an inwardly protruding portion configured to protrude into the main portion when the sealing assembly is coupled to the main portion. The at least one gasket may be in contact with a perimeter of the inwardly protruding portion.

The main portion may include a slack tray configured to house a portion of the at least one cable portion, a splice tray atop the slack tray, and a separator configured to house at least a portion of an intermediate cable, wherein one or more fibers from the at least one cable portion are spliced to one or more fibers from the intermediate cable at the splice tray. The slack tray may be positioned between the splice tray and the separator.

The cable enclosure may further comprise an option module. The option module may be coupled to the splice tray.

The cable enclosure may further comprise an external anchor secured to the main portion. At least one service cable may be configured to extend from the multi-cable terminal to the external anchor. The at least one service cable may be removably connected to the external anchor.

BRIEF DESCRIPTION OF THE DRAWINGS

The accompanying drawings are not intended to be drawn to scale. Also, for purposes of clarity not every component may be labeled in every drawing.

DETAILED DESCRIPTION

Examples of systems and methods are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Figures 1A, 1B:
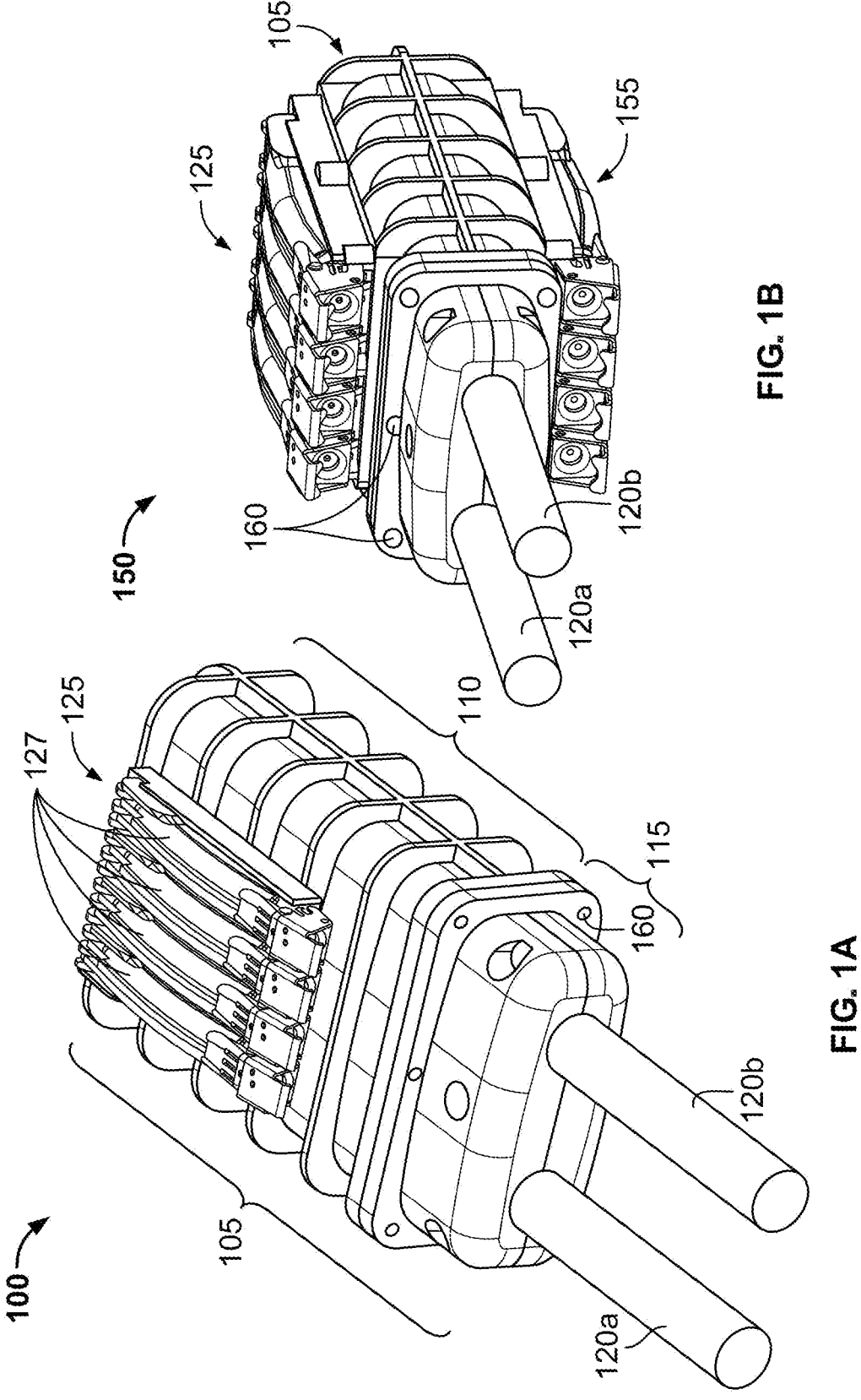
FIG. 1A is a perspective view of a cable enclosure according to an embodiment.
FIG. 1B is a perspective view a cable enclosure according to another embodiment.

FIG. 1A is a perspective view cable enclosure 100 according to an embodiment. The cable enclosure 100 includes a housing 105 having a main portion 110, a sealing assembly 115, and a multi-cable terminal 125. The sealing assembly 115 is configured to accommodate two cable portions 120a and 120b. Each one of the two cable portions 120a and 120b may take the form of a multiple of fibers contained within a cable jacket, or a multiple of smaller cables contained within a cable jacket. Further, in the case of a cable portion taking the form of smaller cables contained within a cable jacket, each of the smaller cables may, in turn, take the form of a single fiber within a cable jacket, a multiple of fibers within a cable jacket, or a multiple of smaller cables within a cable jacket. Also, the two cable portions 120a and 120b may be respective parts of a two distinct cables, or may be parts of a single cable. In any event, one or more fibers from the two cable portions 120a and 120b are coupled to the multi-cable terminal 125, which includes a multiple of sub-structures 127.

FIG. 1B is a perspective view of a cable enclosure 150 according to another embodiment. The enclosure 150 of FIG. 1B is similar to the enclosure of FIG. 1A with the notable exception that the enclosure 150 includes a second multi-cable terminal 155. The second multi-cable terminal 155 is positioned on the main portion 110 of the housing 105 at a side of the main portion 110 that is opposite a side on which the multi-cable terminal 125 is positioned. In the FIG. 1B embodiment, one or more fibers from the two cable portions 120a and 120b are coupled to either or both of the multi-cable terminals 125 and 155.

As can be seen from both FIGS. 1A and 1B, the sealing assembly 115 of the housing 105 may be coupled to the main portion 110 of the housing 105 by a multiple of screws 160, although upon viewing this disclosure one skilled in the art will readily appreciate the numerous alternative techniques for coupling the sealing assembly 115 to the main portion 110.

In addition, it should be noted that either or both of the multi-cable terminals may be formed as integral with the main portion 110 of housing 105, or may be formed separately from the main portion and then affixed to the main portion 110 of housing 105. The case a multi-cable terminal being integral with the main portion 110 and the case of a multi-cable terminal being affixed to the main portion 110 will be collectively referred to as the multi-cable terminal being secured to the main portion 110.

It should be further noted that cable enclosures 100 and 150 of FIGS. 1A and 1B are described in the context of the two cable portions 102a and 102b merely for purposes of illustration. The number of cable portions in the FIG. 1A and FIG. 1B embodiments may be any number of one or more, and upon viewing this disclosure one skilled in the art will readily appreciate how the embodiments of FIGS. 1A and 1B can be implemented with a number of cable portions other than two.

Moreover, the enclosures 100 and 150 described in FIGS. 1A and 1B, as well as the other enclosures described in this disclosure, may be configured for affixing to a holding structure. For example, enclosure 150 may include openings (not shown) for receiving screws that affix the enclosure 150 to a hanger that is, in turn, used to suspend the enclosure 150 from a wall or pole mount.

Figure 2A:
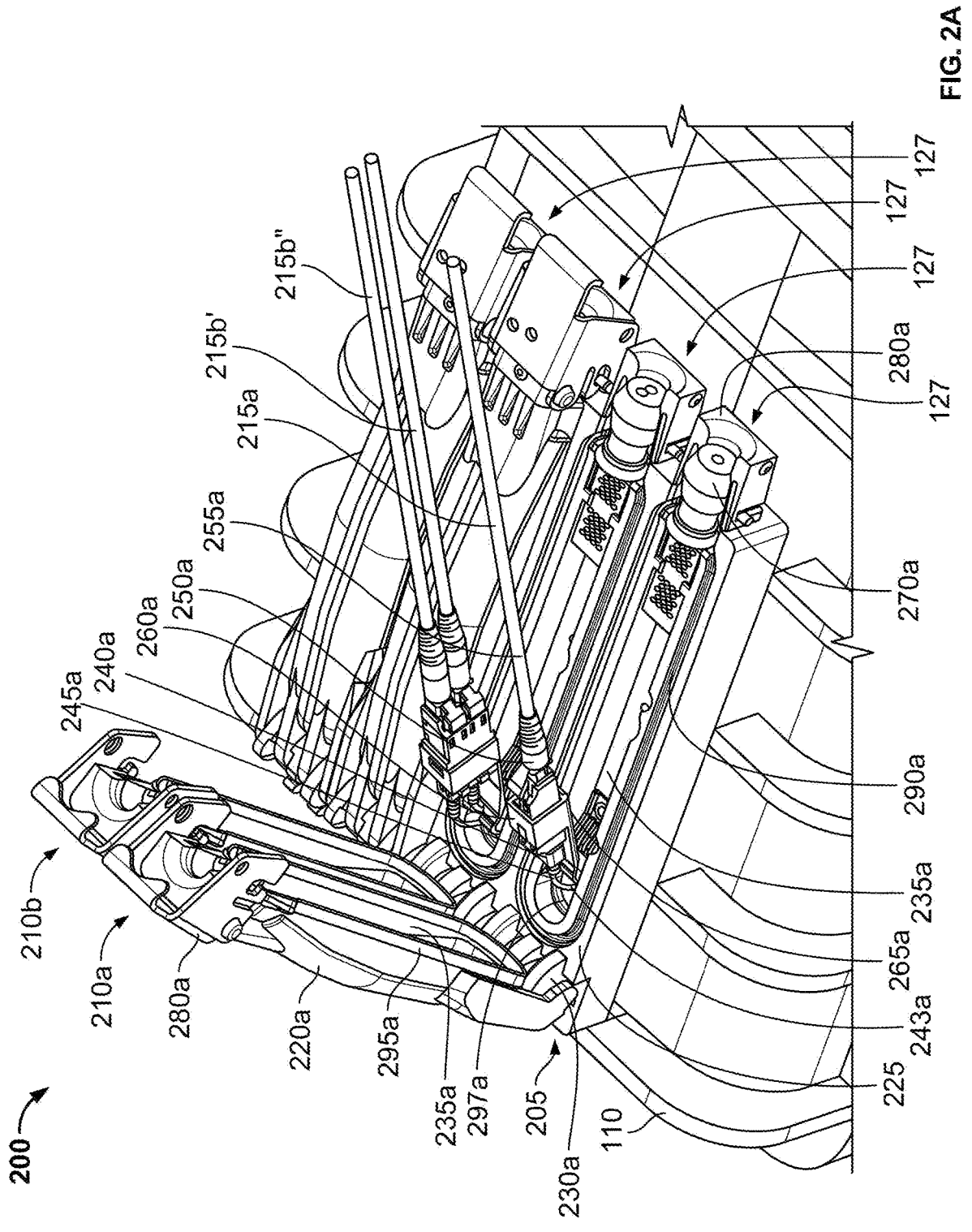
FIG. 2A is a perspective view of a portion of cable enclosure showing two sub-structures of the enclosure in an open position.

Now referring to FIG. 2A, the figure shows a perspective view of a portion of a cable enclosure 200 having a multi-cable terminal 205, with two sub-structures 210a and 210b of the multi-cable terminal 205 shown in an open position. As shown in FIG. 2A, a multiple of service cables 215a, 215b', and 215b'' are coupled to the sub-structures 210a and 210b such that fibers within the service cables 215a, 215b, and 215c may be coupled to fibers in one or both of the two cable portions 120a and 120b (shown in FIG. 2B). In the depicted arrangement service cable 215a is coupled to sub-structure 210a and service cables 215b' and 215b'' are coupled to sub-structure 210b. As can be further seen from FIG. 2A, the sub-structure 210a may include a lid 220a that is movably connected to a base 225 by, for example, a hinge 230a. The lid 220a and base 225 together define a sub-enclosure 235a of the sub-structure 210a.

The sub-enclosure 235a is configured to accommodate a multiple of cable connection elements including a first connector 240a for the an end 245a of an internal cable 243a, a second connector 250a for an end 255a of service cable 215a, and an adaptor 260a for coupling the first connector 240a to the second connector 250a. In this manner, the internal cable 243a and service cable 215a may be coupled to one another by way of the first connector 240*a*, second connector 250*a* and adaptor 260*a*.

In addition, the sub-enclosure 235*a* may be configured to accommodate a support member 265*a*. The support member 265*a* may be used to secure one or more of the cable connection elements, e.g., to secure adaptor 260*a*, as shown. Moreover, the support member 265*a* may be movable so that the secured connection elements are movable with the support member 265*a* when the sub-structure 210*a* is in an open position. For instance, the support member 265*a* may be connected to the sub-enclosure 235*a* by a hinge. Further, the support member 265*a* may be arranged to move automatically into an exposed position when the sub-structure 210*a* is opened.

Notably, in some embodiments, when the end 245*a* of the internal cable 243*a*, the end 255*a* of the service cable 215*a*, and the cable connection elements are positioned in the sub-enclosure 235*a*, a cable seal 270*a* is positioned in the sub-structure 210*a* and about service cable 215*a*, and the lid 220*a* of the sub-structure 210*a* is closed against the base 225, a watertight seal is created around the cable connection elements. Such watertight seal may be insured by including a gasket 290*a* in the base 225 for contacting a lip 295*a* in the lid 220*a* when the sub-structure 210*a* is in the closed position. Also, a watertight seal of the sub-enclosure 235 relative to the main portion 110 may be insured by a port sealer 297*a*. Further, a fastener 280*a* may be provided for securing the sub-structure 210*a* in the closed position. In the FIG. 2A configuration, the fastener 280*a* is clamp, although it should be noted that a wide range of alternatives may be employed, such as a ring-shaped threaded fastener that engages with a threaded end of the sub-structure 210*a* with the service cable 215*a* passing through the fastener.

Referring back to the multi-cable terminal 200 in general, each of the sub-structures 127 may take the same form as sub-structure 210*a*. However, it should be noted that it is not necessary for the sub-structures 127 to have the same form as each other, or to take the form of sub-structure 210*a*. For example, the multi-cable terminal 205 may include some sub-structures having the form of sub-structure 210*a* and other sub-structures that take a different form, such as the form depicted for sub-structure 210*b*. Or the multi-cable terminal 205 may include only sub-structures having a form different from the form of sub-structure 210*a*.

Figure 2B:
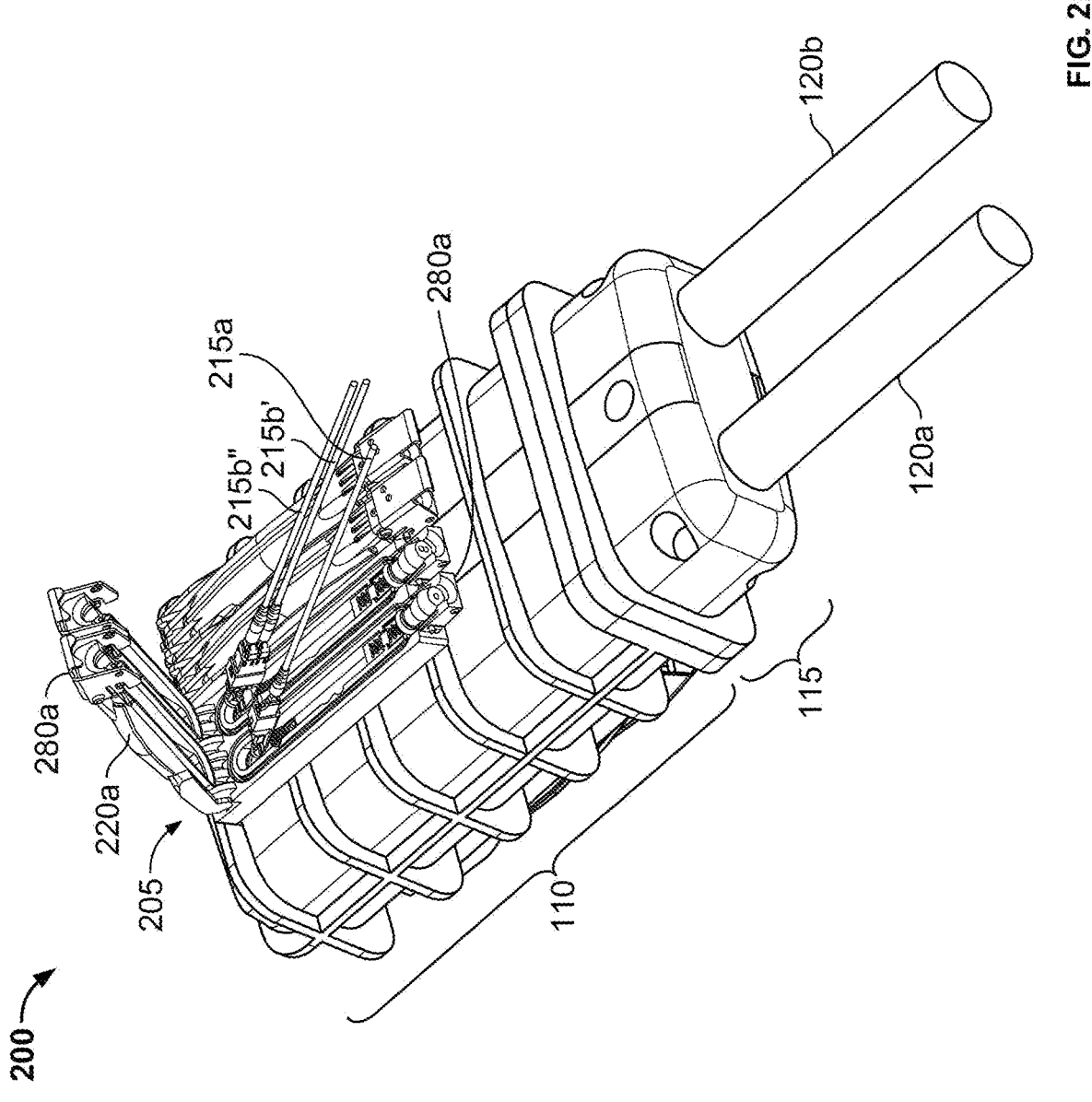
FIG. 2B is a perspective view the arrangement of FIG. 2A, in which the entire enclosure is shown.

FIG. 2B is a perspective view the arrangement of FIG. 2A, in which the entire enclosure 200 is shown.

Figure 3A:
FIG. 3A is an exploded perspective view of a cable enclosure showing parts of the enclosure without showing internal cable routing.

FIG. 3A is an exploded perspective view of a cable enclosure 300 showing parts of the enclosure 300 and showing parts of cable portions 102*a* and 120*b*, without showing any of the internal cable routing of the enclosure 300. As can be seen from the figure, the sealing assembly 115 may be made up of two halves, a first half 115*a* and a second half 115*b*, and the enclosure 300 may include a slack tray 305, a splice tray 310, an option module 315, and a separator 320. The slack tray 305, splice tray 310, option module 315, and separator 320 are internal to the enclosure 300 when the enclosure is fully assembled.

The option module 315 is an optional element and may or may not be included in the cable enclosures described in this disclosure. The option module 315 may include any one or more of a splitter, a tap filter, a wavelength division multiplexer (WDM) filter, an opto-electronics module, and the like.

Figure 3B:
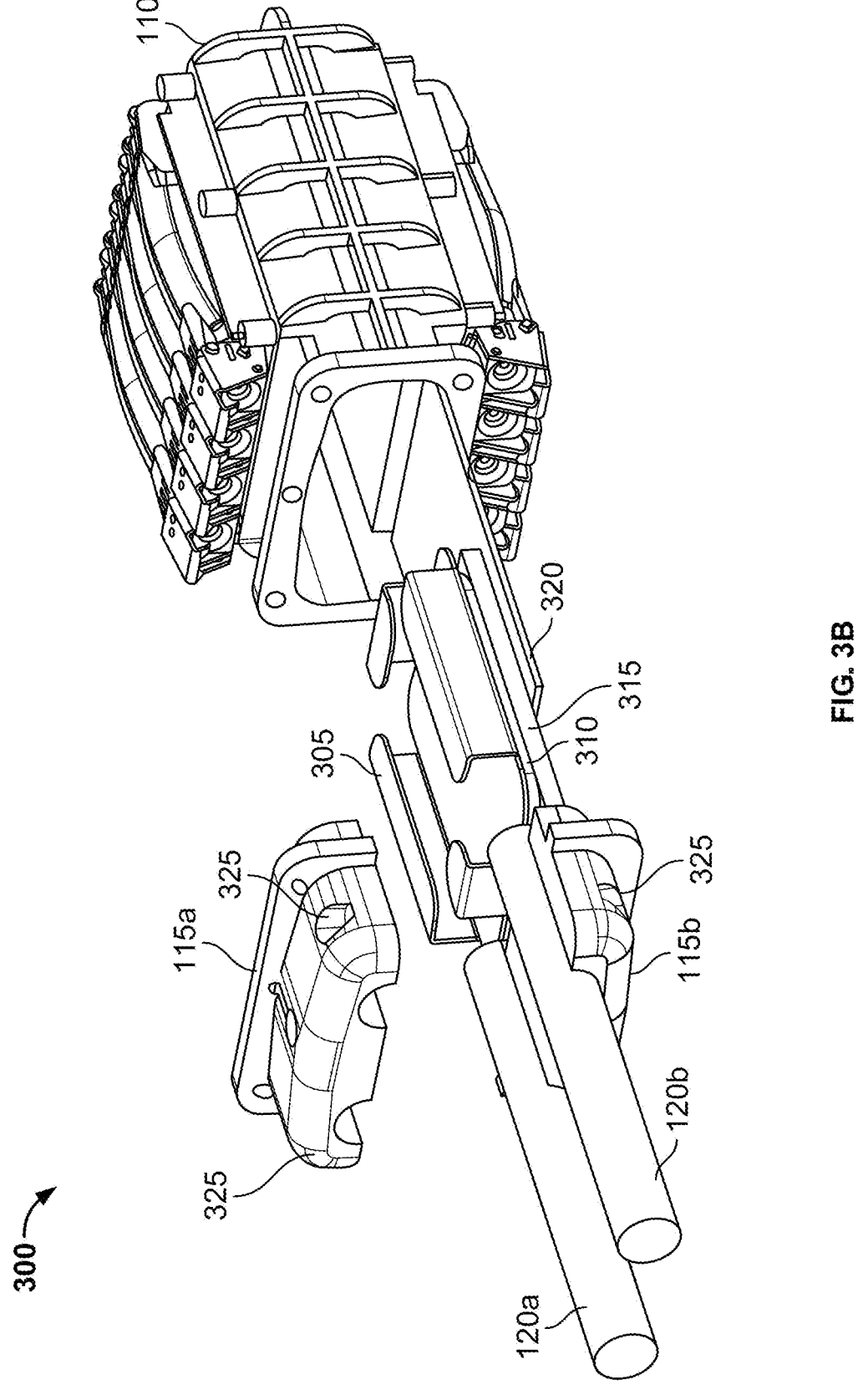
FIG. 3B is a partially exploded perspective of the cable enclosure of FIG. 3A, showing how the parts of FIG. 3A come together to form the enclosure.

Referring now to FIG. 3B, the figure shows a partially exploded perspective view of the cable enclosure 300 of FIG. 3A, showing how the parts of FIG. 3A come together to form the enclosure 300. As can be see, the slack tray 305 may be positioned atop the splice tray 310, which, in turn, may be positioned above the option module 315. The separator 320 may be positioned below the option module 315, and may contact the option module 315, although in other embodiments the option module 315 is not included and the splice tray 310 may be positioned directly above the separator 320 and may or may not contact the separator 320.

In some embodiments the slack tray 305 and splice tray 310 may be formed as a single integrated part or as a single assembly. Further, in some embodiments the slack tray 305 may be attached to the sealing assembly 115 through an assembly support part. Still further, in some embodiments the splice tray 310 and option module 315 may be formed as a single integrated part or as a single assembly.

Figure 3C:
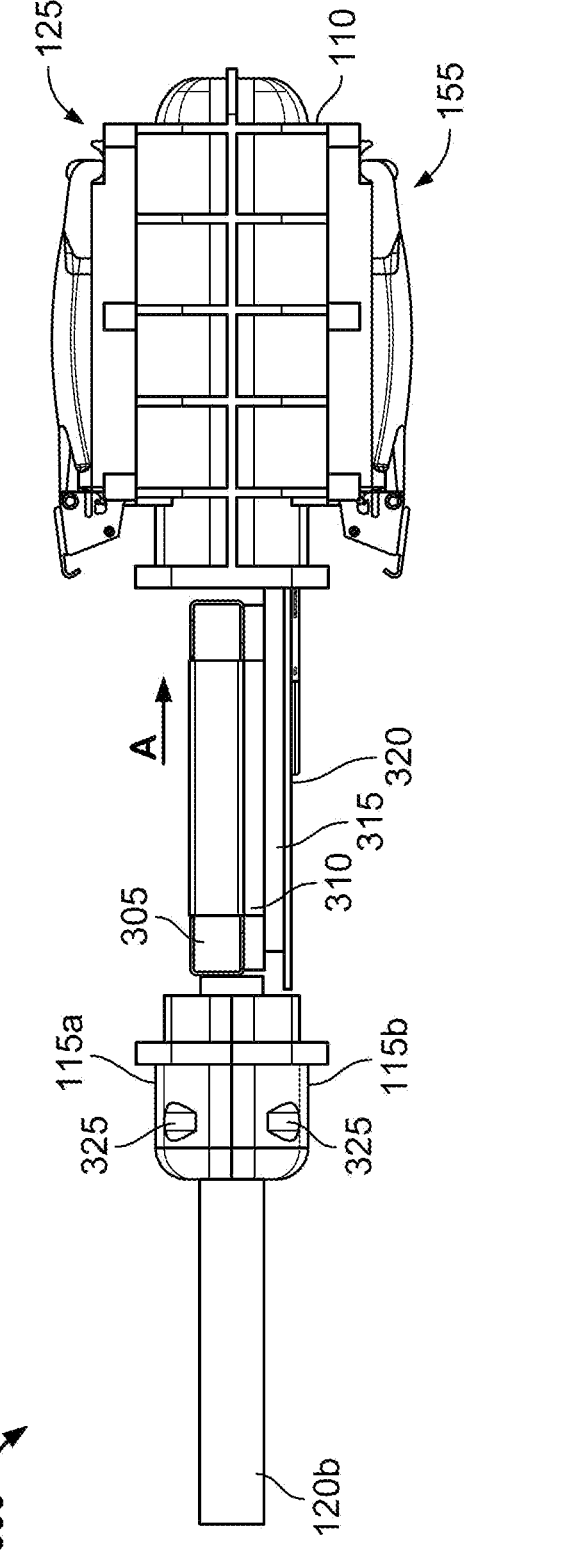
FIG. 3C is a partially exploded profile view of the cable enclosure of FIG. 3A, showing how the parts of FIG. 3A come together to from the enclosure.

Turning to FIG. 3C, the figure shows a partially exploded profile view of the cable enclosure 300 of FIG. 3A, showing how the parts of FIG. 3A come together to from the enclosure 300. As shown, by observing FIG. 3C in view of FIG. 3B, the two cable portions 120*a* and 120*b* may be positioned within one of the halves of the sealing assembly 115 (the second half 115*b* in the illustrated example) and then the other half (the first half 115*a* in the illustrated example) may be brought into contact with the half in which the two cable portions are positioned. Once the two halves of the sealing assembly 115 are brought together in this manner, the two halves may be secured to each other, e.g., by screws in screw holes 325, thereby securing the cable portions 120*a* and 120*b* within the sealing assembly. Final assembly of the enclosure 300 is achieved by placing the slack tray 305, splice tray 310, option module 315, and separator 320 into the main portion 110 by moving the slack tray 305, splice tray 310, option module 315, and separator 320 in direction A in FIG. 3C, and then moving the sealing assembly 115 with halves 115*a* and 115*b* attached and cable portions 120*a* and 120*b* secured, in direction A in FIG. 3C. When the sealing assembly 115 is moved along direction A and contacts the main portion 110, the sealing assembly 115 may be secured to the main portion 110, e.g., by means of screws 160 (as shown in FIG. 1B).

Figure 4A:
FIG. 4A is an exploded perspective view of a cable enclosure showing parts of the enclosure and internal cable routing.

FIG. 4A is an exploded perspective view of a cable enclosure 400 showing parts of the enclosure 400 and the internal cable routing. For purposes of simplicity of description, the internal cable routing is shown in the context of the same enclosure parts as the parts shown in FIG. 3A. In FIG. 4, the cable portion 120*a* includes a multiple of sub-cables 405, and the cable portion 120*b* includes a multiple of sub-cables 410. One or more of the sub-cables 405 and 410, that is one or more of the cables taken from either sub-cables 405 or sub-cables 410, or from both sub-cables 405 and sub-cables 410, is routed from the slack tray 305 to the splice tray 310, illustrated by cable 415 in FIG. 4A. At the splice tray 310, one or more fibers from cable 415, illustrated by fiber 420, is spliced to one or more fibers from an intermediate cable 425, illustrated by fiber 430. Intermediate cable 425 also has slack stored in slack tray 305 and is routed between the slack tray 305 and the option module 315. The intermediate cable 425 is coupled to the option module 315. Further, an internal cable 435 coupled to the option module 315 passes through the separator 320 and is routed to one of a sub-structures 210*d* of the substructures 210 of multi-cable terminal 125.

Regarding the option module 315, if the option module 315 is not included in enclosure 400, the cable 425 may be routed directly from the slack tray 305 to the separator 320, and pass through the separator 320 such that the internal cable 435 is merely a continuation of the cable 425.

Regarding cables 425 and 435, the cables are used merely as illustrations. The number of cables passing from the splice tray 305 to the slack 310 and on to the option module 315 is not limited to one cable, and may be a multiple of cables; and similarly, the number of cables passing from the option module 315 to the multi-cable terminal 125 is not limited to one cable, and may be a multiple of cables.

Figure 4B:
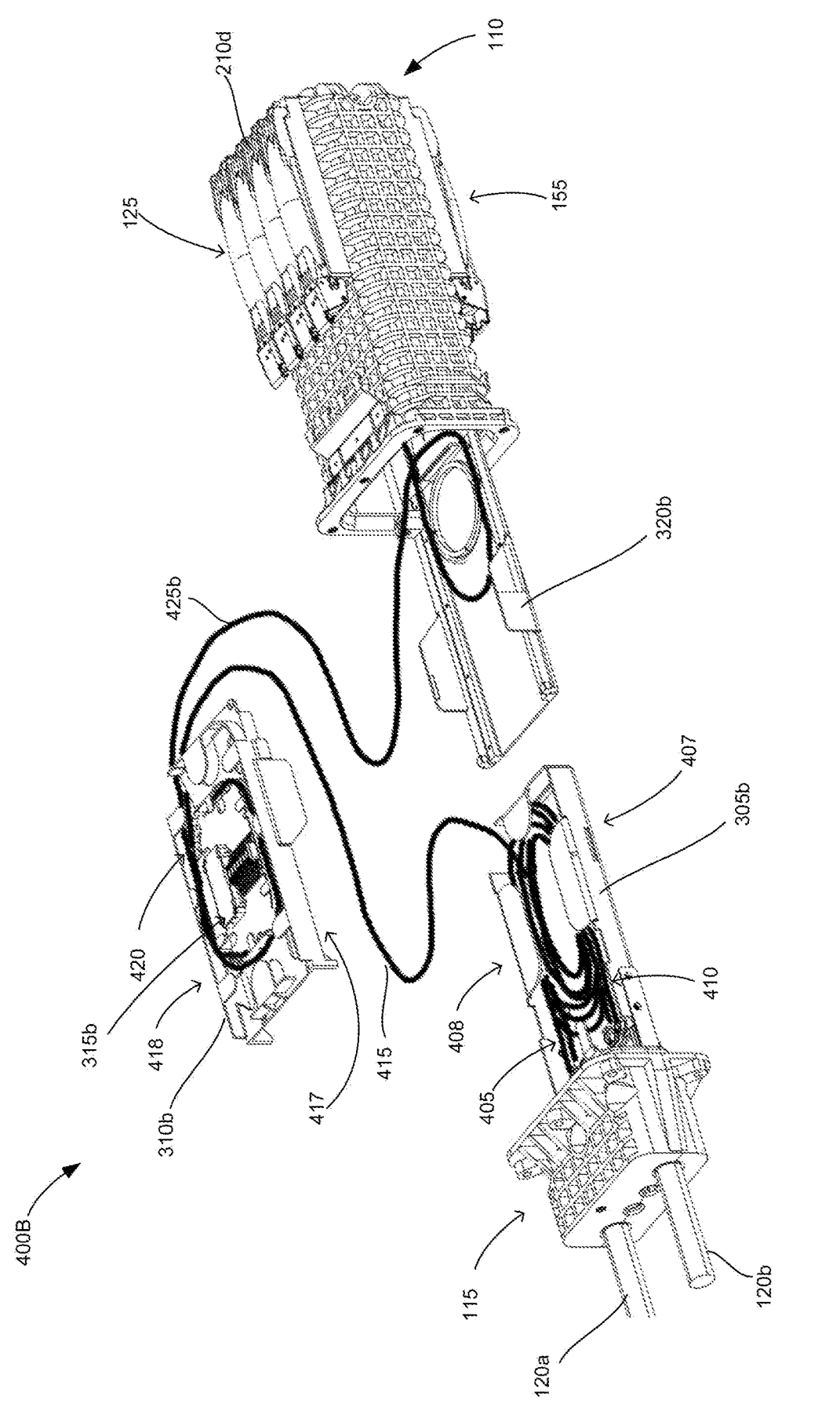
FIG. 4B is an exploded perspective view of another cable enclosure showing parts of the enclosure and internal cable routing.

FIG. 4B is an exploded perspective view of cable enclosure 400B showing parts of the enclosure 400B and the internal cable routing. Cable enclosure 400B is similar to enclosure 400 of FIG. 4A except for the arrangement of the slack tray 305b, splice tray 310b, and option module 315b. As shown in FIG. 4B, option module 315b may be integrated or integral with splice tray 310b. In some examples, option module 315b may be a separate component that is coupled to splice tray 310b, as shown in FIG. 4A. According to some examples, enclosure 400B may, additionally or alternatively, include a separator 320b.

As discussed above with respect to FIG. 4A, cable portion 120a may include a plurality of sub-cables 405 and cable portion 120b may include a plurality of sub cables 410. The sub-cables 405, 410 may have slack that is stored in slack tray 305b. One or more of the sub-cables 405, 410, that is one or more of the cables taken from either sub-cables 405 or sub-cables 410, or from both sub-cables 405 and sub-cables 410, may be routed from the slack tray 305 to splice tray 310b, illustrated by cable 415 in FIG. 4B.

Figure 4C:
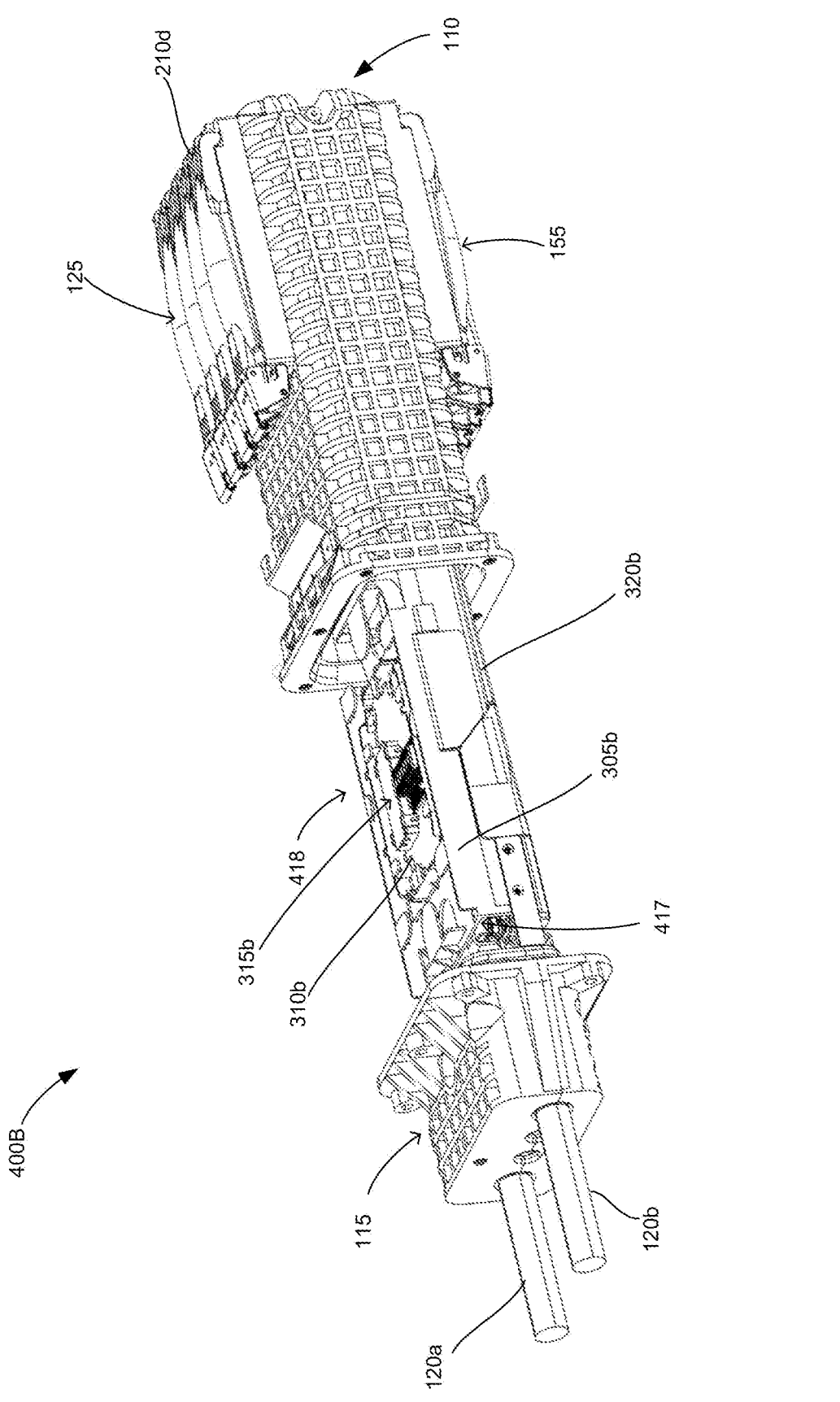
FIG. 4C is a perspective view of the arrangement of FIG. 4B showing parts of the enclosure without showing internal cable routing.

As shown in FIG. 4C and as compared to the configuration shown in FIG. 4A, splice tray 310b may be positioned above slack tray 305b when splice tray 310b and slack tray 305b are within enclosure 400B. For example, slack tray 305b may have a bottom portion 407 and a top portion 408 and splice tray 310b may have a bottom portion 417 and a top portion 418. The bottom portion 417 of splice tray 310b may be positioned above, or adjacent to, top portion 408 of slack tray 305b. In such an example, slack tray 305b may be positioned between splice tray 310b and separator 320b.

At splice tray 310b, one or more fibers from cable 415, illustrated by fiber 420, may be spliced to one or more fibers from an intermediate cable 425. According to some examples, intermediate cable 425b is routed between splice tray 310b and options module 315b. In another examples, intermediate cable 425b may be coupled to option module 315. Intermediate cable 425 may have slack stored in separator 320b. Intermediate cable 425 may be routed to one of a substructures 210d of substructures 210 of multi-cable terminal 125, 155.

Figure 5:
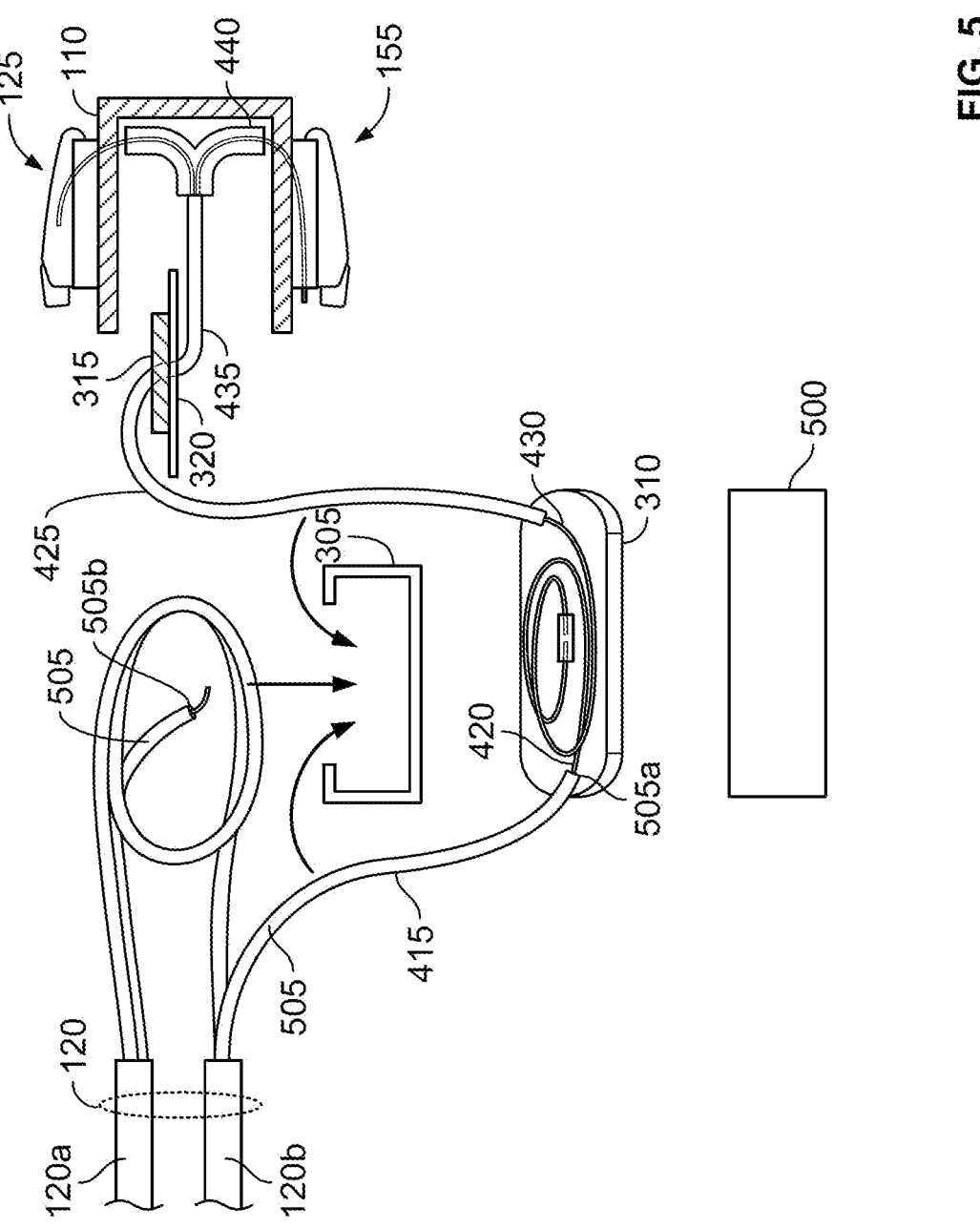
FIG. 5 is a functional diagram to aid in understanding of the cable routing shown in FIG. 4.

FIG. 5 is a functional diagram to aid in understanding of the cable routing shown in FIGS. 4A and 4B. FIG. 5 also depicts how the slack storage 305 and splice tray 310 enable splicing of fibers on a splice machine 500. In the figure, the two cable portions 120a and 120b are depicted as part of a single cable 120, and sub-cable 415 is one part of a sub-cable 505 that has been split, such that the ends 505a and 505b correspond to each other. In order to splice the fiber 420 emerging from end 505a to fiber 430 of cable 425, the fibers 420 and 430 are positioned on the splice tray 310, and the splice tray is then moved to the splice machine 500 (apart from the other cable enclosure elements) so that a fusion splice can be performed. The cable stored in the slack tray 305 makes such movement of the splice tray 310 possible.

In addition, FIG. 5 depicts an embodiment in which two fibers are split from internal cable 435, pass through a boot 440 and are respectively coupled to multi-cable terminal 125 and multi-cable terminal 155. More generally, an internal cable passing through separator 320 will carry multiple fibers, and the fibers will couple to respective sub-structures of multi-cable terminals of the cable enclosure.

Figures 6A, 6B, 6C:
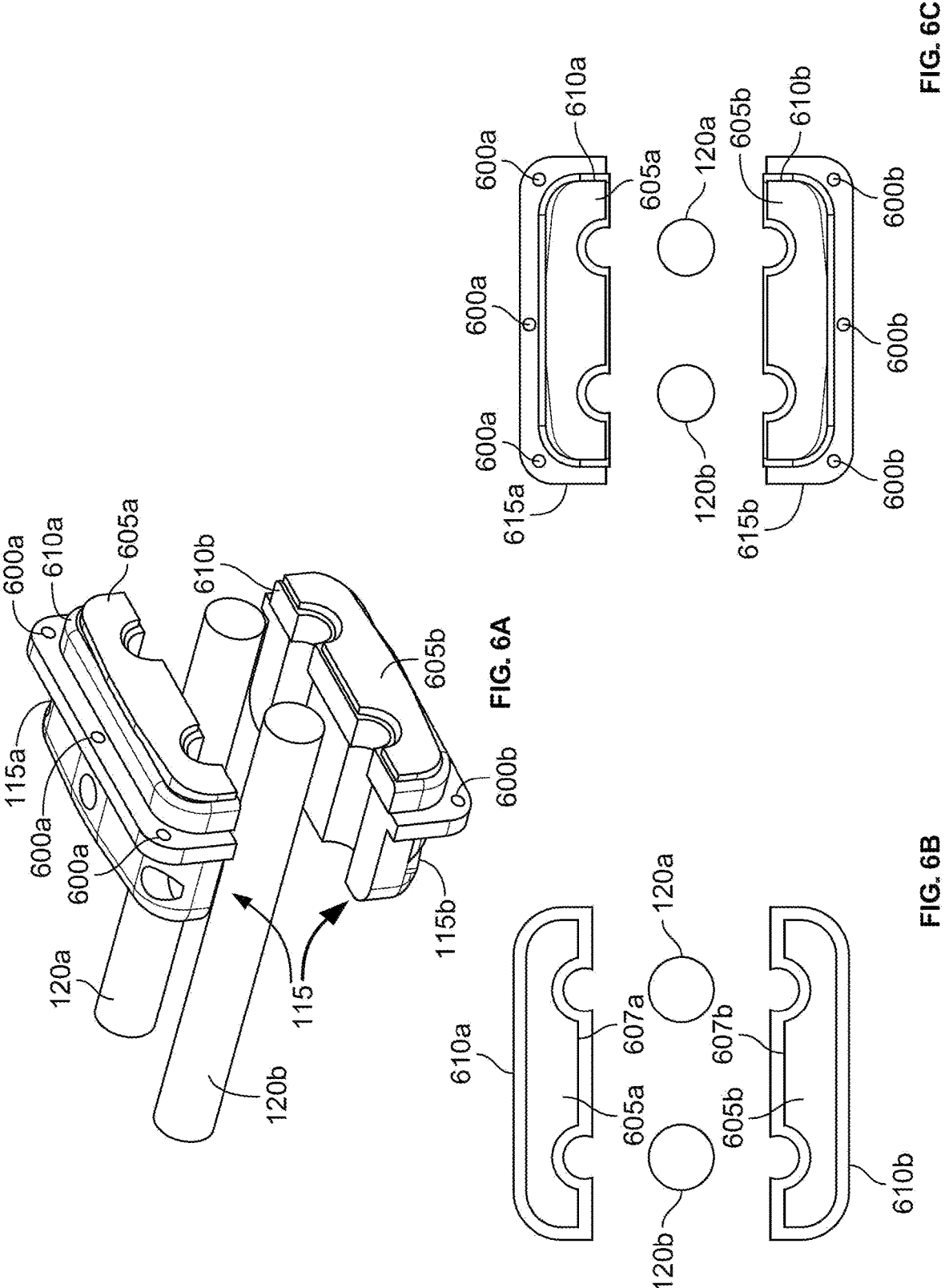
FIG. 6A is a perspective view showing two cable portions and an exploded view of a main enclosure sealing assembly.
FIG. 6B is a cross-sectional view of the FIG. 6A arrangement, showing only the two cable portions and two gasket portions of the main enclosure sealing assembly.
FIG. 6C is a cross-sectional view of the FIG. 6A arrangement, showing the two cable portions, the gasket portions, and other portions of the main enclosure sealing assembly.

Turning now to FIG. 6A, the figure is a perspective view showing the two cable portions 120a and 120b, and an exploded view of the main enclosure sealing assembly 115. As can be seen from the figure, the first half 115a of the sealing assembly 115 includes screw holes 600a for securing the first half 115a to a main portion of an enclosure (not shown), a first inwardly protruding portion 605a which protrudes into the main portion when the enclosure is fully assembled, and first gasket 610a which, when the enclosure is fully assembled, provides a watertight seal between the first half 115a and the main enclosure, between the first half 115a and the two cable portions 120a and 120b, and between the first half 115a and the second half 115b. Similarly, the second half 115b of the sealing assembly includes screw holes 600b for securing the second half 115b to a main portion of an enclosure (not shown), a second inwardly protruding portion 605b which protrudes into the main portion when the enclosure is fully assembled, and second gasket 610b which, when the enclosure is fully assembled, provides a watertight seal between the second half 115b and the main enclosure, between the second half 115b and the two cable portions 120a and 120b, and between the second half 115b and the first half 115a.

Notably, the sealing assembly 115 is described as including a first half 115a and a second half 115b for purposes of facilitating description. However, the sealing assembly of the presently described technology need not be made up of two halves. For example, the sealing assembly may include two parts or sub-assemblies that are of different sizes, may include more than two parts or sub-assemblies that are of equal sizes or that vary in size, or may be made up of a single part or sub-assembly.

Having noted that the sealing assembly 115 may take forms other than the two halves form described in this disclosure, the description is continued using in the context of the two halves embodiment.

Referring to FIG. 6B, the figure shows a cross-sectional view of the FIG. 6A arrangement, showing only the two cable portions 120a and 120b and the first gasket 610a and second gasket 610b. As can be seen, the first gasket 610a may contact a perimeter 607a of inwardly protruding portion 605a, and the second gasket 610b may contact a perimeter 607b of inwardly protruding portion 605b.

FIG. 6C is a cross-sectional view of the FIG. 6A arrangement, showing the two cable portions 120a and 120b, the screw holes 600a and 600b, the first gasket 610a and second gasket 610b, and the first inwardly protruding portion 605a and the second inwardly protruding portion 605b. The screw holes 600a are positioned in a first flange 615a of the first half 115a of the sealing assembly 115, and the screw holes 600b are positioned in a second flange 615b of the second half 115b of the sealing assembly 115.

Figures 7A, 7B:
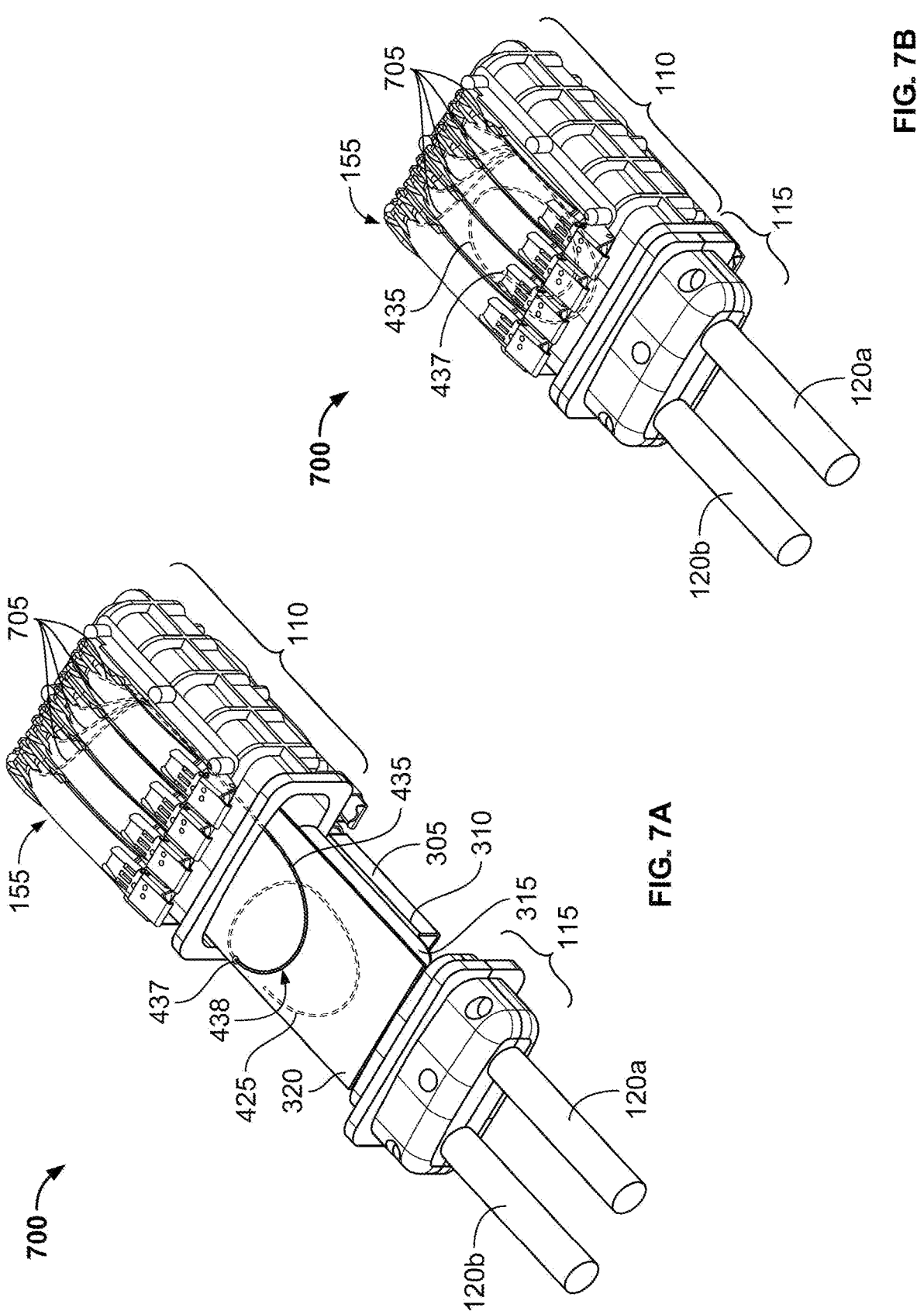
FIG. 7A is a perspective view of a cable enclosure like that of FIG. 4 in an open position, before the enclosure is sealed by the sealing assembly.
FIG. 7B is a perspective view of the cable enclosure of FIG. 7A in a closed position, after the enclosure is sealed by the sealing assembly.

Turning now to FIG. 7A, the figure shows a perspective view of a cable enclosure 700 like that of FIG. 4A in an open position, before the enclosure is sealed by the sealing assembly 115. The view is generally opposite the view shown in FIG. 4A, and thus the separator 320 appears closer to the observer than the slack tray 305. As can be seen from FIG. 7A, the separator 320 serves to partition the main portion 110 of the enclosure such that intermediate cable 425 does not get tangled with internal cable 435 when the enclosure 700 is fully assembled, as shown in FIG. 7B. Moreover, in the embodiment of FIGS. 7A and 7B, the internal cable 435 carries a multiple of optical fibers 705, and the optical fibers 705 are coupled to respective sub-enclosures of the multi-cable terminal 155.

It should be noted that in the embodiments of FIGS. 7A and 7B the intermediate cable 425 and the internal cable 435 are on opposite sides of the separator 320. Further, it should be noted that the internal cable 435 may be arranged to have a spooling direction that does not change when the internal cable 435 is in a pulled-out state (FIG. 7A), and to have a portion 437 that is fixed to separator 320. As can be seen from FIG. 7A, when the internal cable 435 is in the pulled-out state, at least one section of the internal cable 435, e.g., section 438, is proximal the fixed portion 437.

Figure 8A:
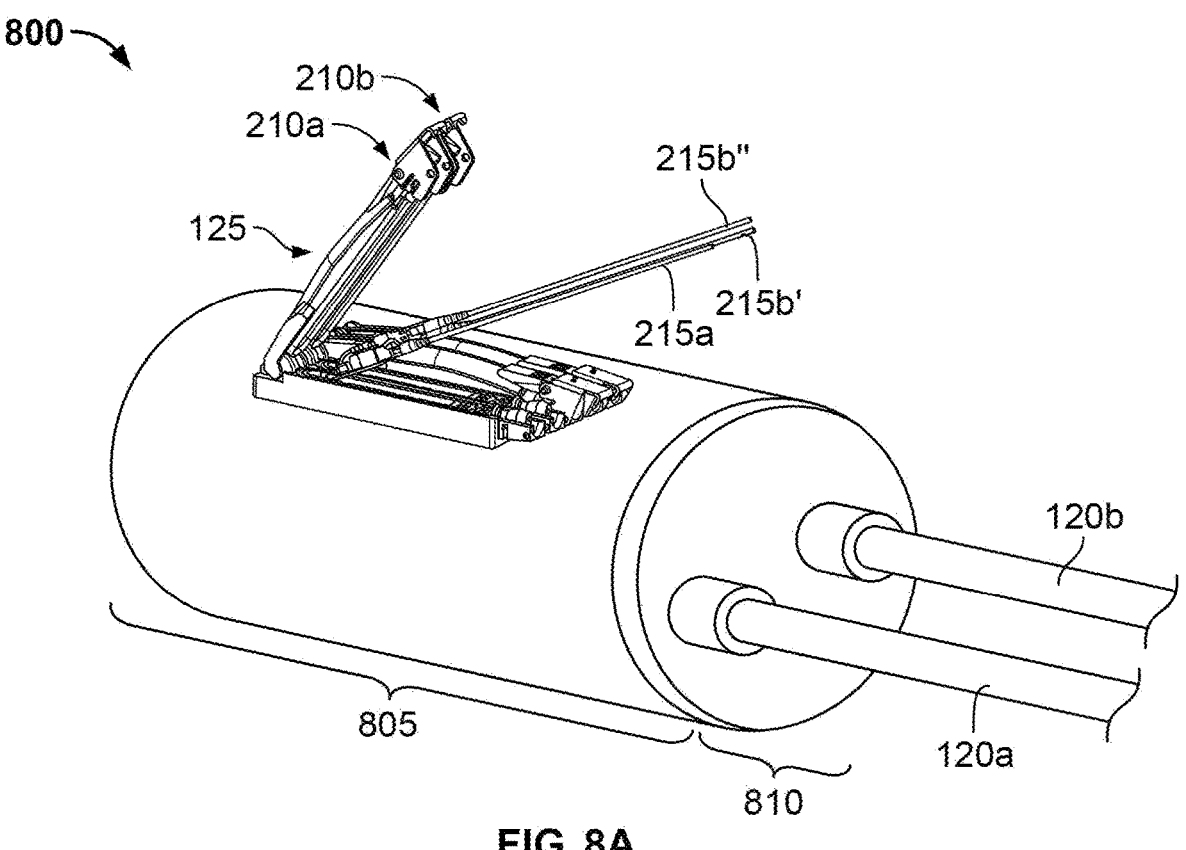
FIG. 8A is a perspective view of a dome cable enclosure of an embodiment.
Figure 8B:
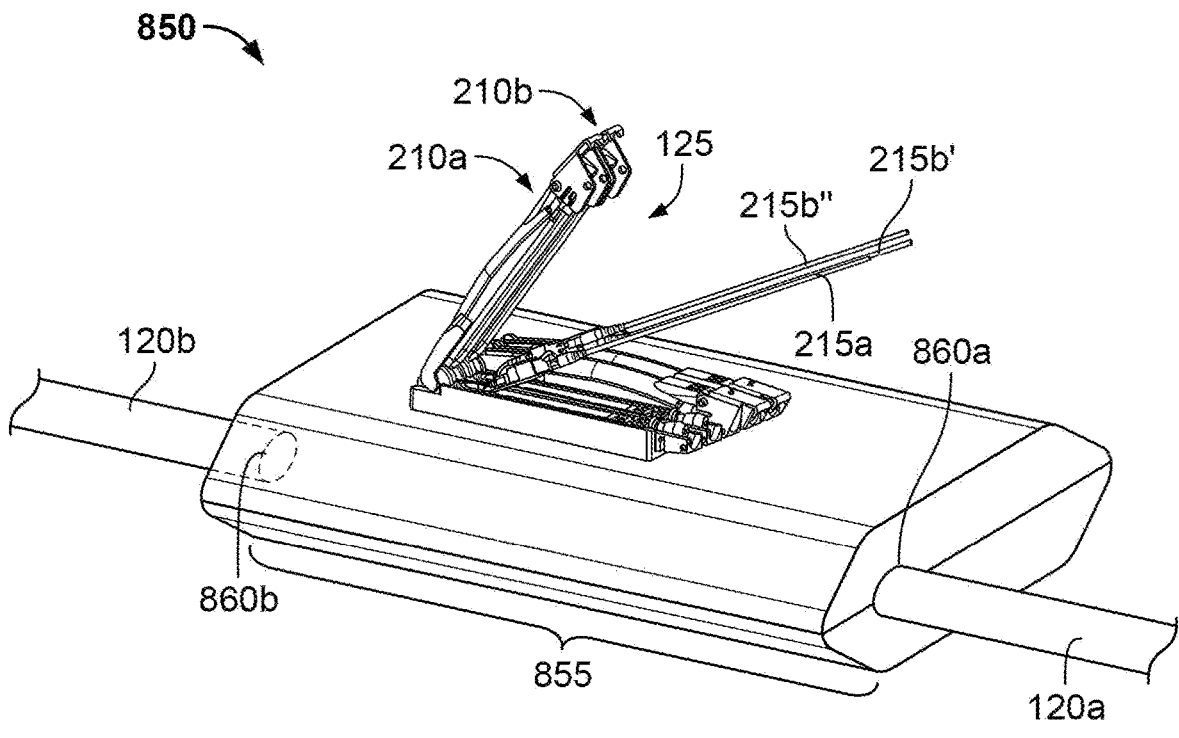
FIG. 8B is a perspective view of an in-line cable enclosure of an embodiment.

Referring now to FIGS. 8A and 8B, the figures show perspective views of cable enclosures according to two possible embodiments. FIG. 8A shows a perspective view of a dome cable enclosure 800 of an embodiment. The enclosure 800 includes a multi-cable terminal, e.g., multi-cable terminal 125 shown in FIG. 2A, and may have a main portion 805 that has a shape different from that of main portion 110 and a sealing portion 810 that is different from sealing portion 115. As shown, the enclosure 800 may accommodate the two cable portions 120a and 120b. FIG. 8B shows a perspective view of an in-line cable enclosure 850 of an embodiment. The enclosure 850 includes a multi-cable terminal, e.g., multi-cable terminal 125 shown in FIG. 2A, and may have a main portion 855 that has shape different from that of main portions 110 and 805. Further, the enclosure 850, may not have a sealing portion, and may accommodate two cable portions 120a and 120b respectively via enclosure opening 860a and enclosure opening 860b. As shown, the enclosure openings 860a and 860b may be positioned opposite one another on the main portion 855, although opposite positioning is not necessary and the openings 860a and 860b may be positioned on any two different surfaces of the main portion 855, or on the same surface of the main portion 855.

It should be noted that cable enclosures 800 and 850 of FIGS. 8A and 8B are described in the context of the two cable portions 102a and 102b merely for purposes of illustration. The number of cable portions in the FIG. 8A and FIG. 8B embodiments may be any number of one or more, and upon viewing this disclosure one skilled in the art will readily appreciate how the embodiments of FIGS. 8A and 8B can be implemented with a number of cable portions other than two.

Figure 9A:
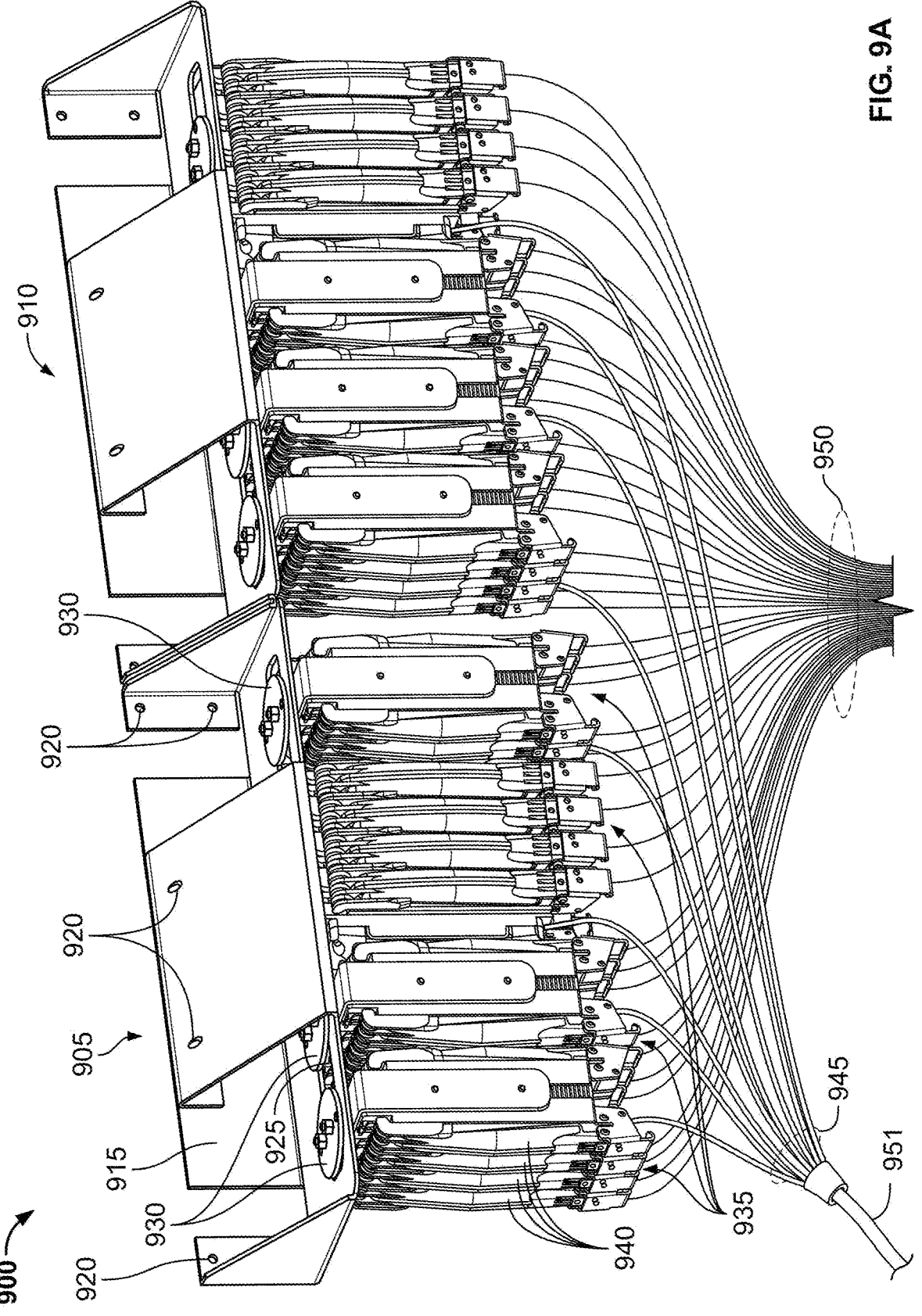
FIG. 9A is a perspective view of an arrangement of a multiple of multi-cable terminals according to an embodiment.

Referring now to FIG. 9A, the figure shows a perspective view of a terminal arrangement 900. The terminal arrangement 900 includes a first sub-assembly 905 and a second sub-assembly 910, although other embodiments may include any number of one or more sub-assemblies. Sub-assembly 905 will be described in detail, with the understanding that such description equally applies to sub-assembly 910. Sub-assembly 905 includes a mount 915 that may be secured to, for example, a pole or wall by screws passing through screw holes 920. The mount 915 includes a slot 925 that can accommodate a multiple of hangers 930. The hangers 930 are free to rotate and translate within the slot 925, and respectively support a multiple of multi-cable terminals 935 which may respectively rotate and translate with the corresponding hanger. Each of the multi-cable terminals 935 has multiple sub-enclosures, e.g., sub-enclosures 940. The multi-cable terminals 935 are configured to receive respective ones of a multiple of feeder cables 945, which may fan out from a main feeder cable 951. Further, each of the feeder cables 945 may carry a multiple of fiber optic cables which may fan out within the feeder cable's corresponding multi-cable terminal, such that the fanned-out fiber optic cables may respectively couple to the sub-enclosures of the multi-cable terminal at positions internal to multi-cable terminal. Moreover, each of the sub-enclosures may include elements for coupling to one or more drop cables 950 that are external to the multi-cable terminals 935, with the sub-enclosures of the multi-cable terminals 935 serving to couple one or more of the drop cables 950 to one or more of the fiber optic cables fanned-out from the feeder cables 945.

Figures 9B, 9C:
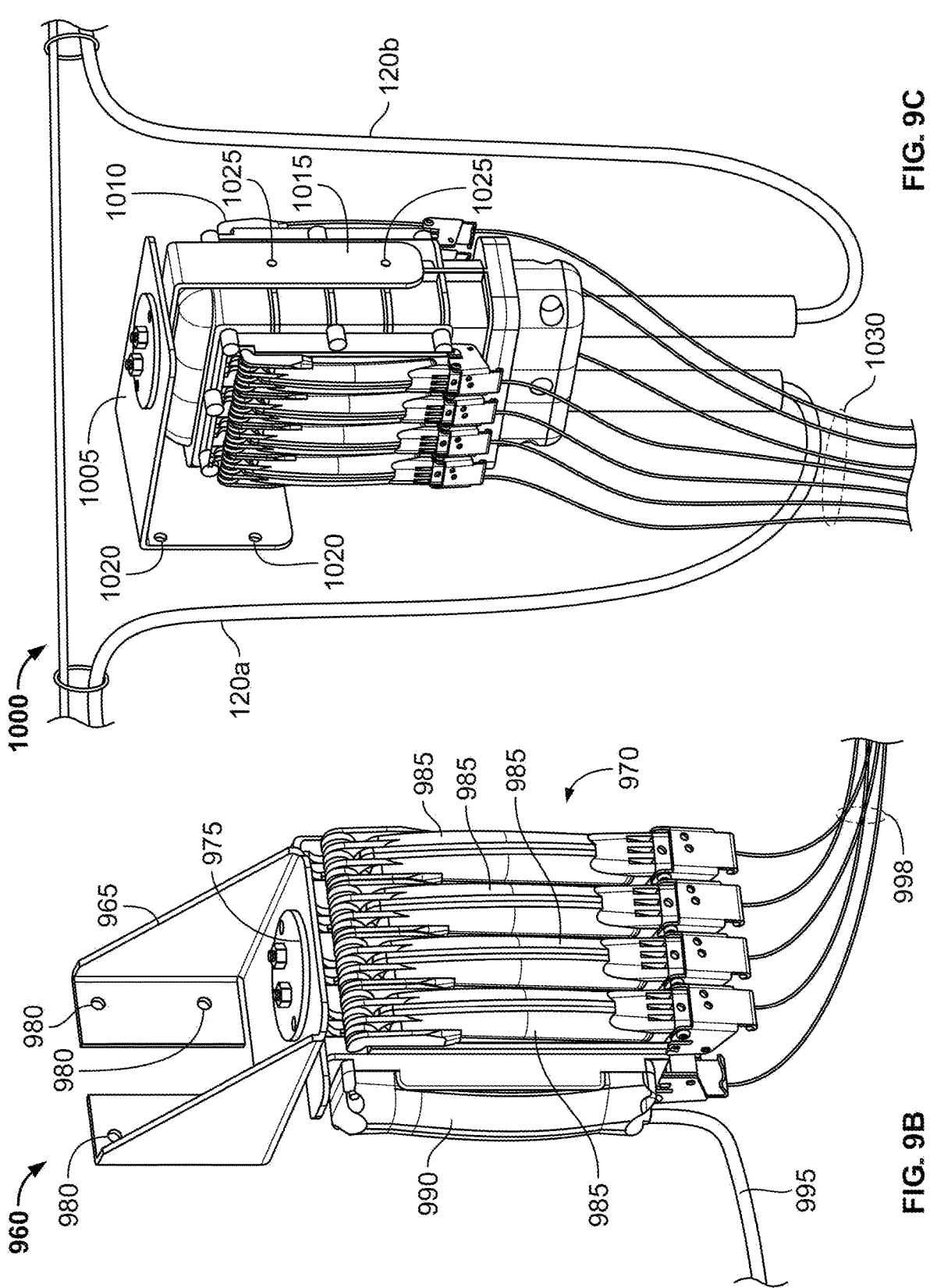
FIG. 9B is a perspective view of a multi-cable terminal arrangement according to an embodiment.
FIG. 9C is a perspective view of a cable enclosure according to an embodiment.

Turning now to FIG. 9B, the figure shows a perspective view of a terminal arrangement 960 according to an embodiment. The terminal arrangement 960 includes a mount 965 and a single multi-cable terminal 970 coupled to the mount 965 via a hanger 975. The mount 965 may be secured to, for example, a pole or wall by screws passing through screw holes 980. The hanger 975 is free to rotate relative to the mount 965, and the multi-cable terminal 970 may rotate with the hanger 975. The multi-cable terminal 970 has multiple sub-enclosures, e.g., sub-enclosures 985, and a feeder cable input 990. The feeder cable input 990 is configured to receive a feeder cable 995, which may fan out within the multi-cable terminal 970 into a multiple of fiber optic cables, with the multiple of fiber optic cables being coupled to respective drop cables 998 via respective sub-enclosures 985.

Turning now to FIG. 9C, the figure shows a perspective view of a cable enclosure arrangement 1000 according to an embodiment. The cable enclosure arrangement 1000 includes a mount 1005 and a cable enclosure 1010 coupled to the mount 1005 via a hanger 1015. The mount 1005 may be secured to, for example, a pole or wall by screws passing through screw holes 1020. The hanger 1015 is free to rotate relative to the mount 1005, and the cable enclosure 1010 may rotate with the hanger 1015. The cable enclosure 1010 may take the form, for example, of the cable enclosure 150 of FIG. 1B, although the enclosure of FIG. 1B may be modified for mounting from the hanger 1015 by including screw holes for receiving screws passing through screw holes 1025 of the hanger 1015. The cable enclosure 1010 may receive the two cable portions 120a and 120b, and the enclosure 1010 may serve to couple fiber optic cables within the two cable portions 120a and 120b to drop cables 1030.

Figure 9D:
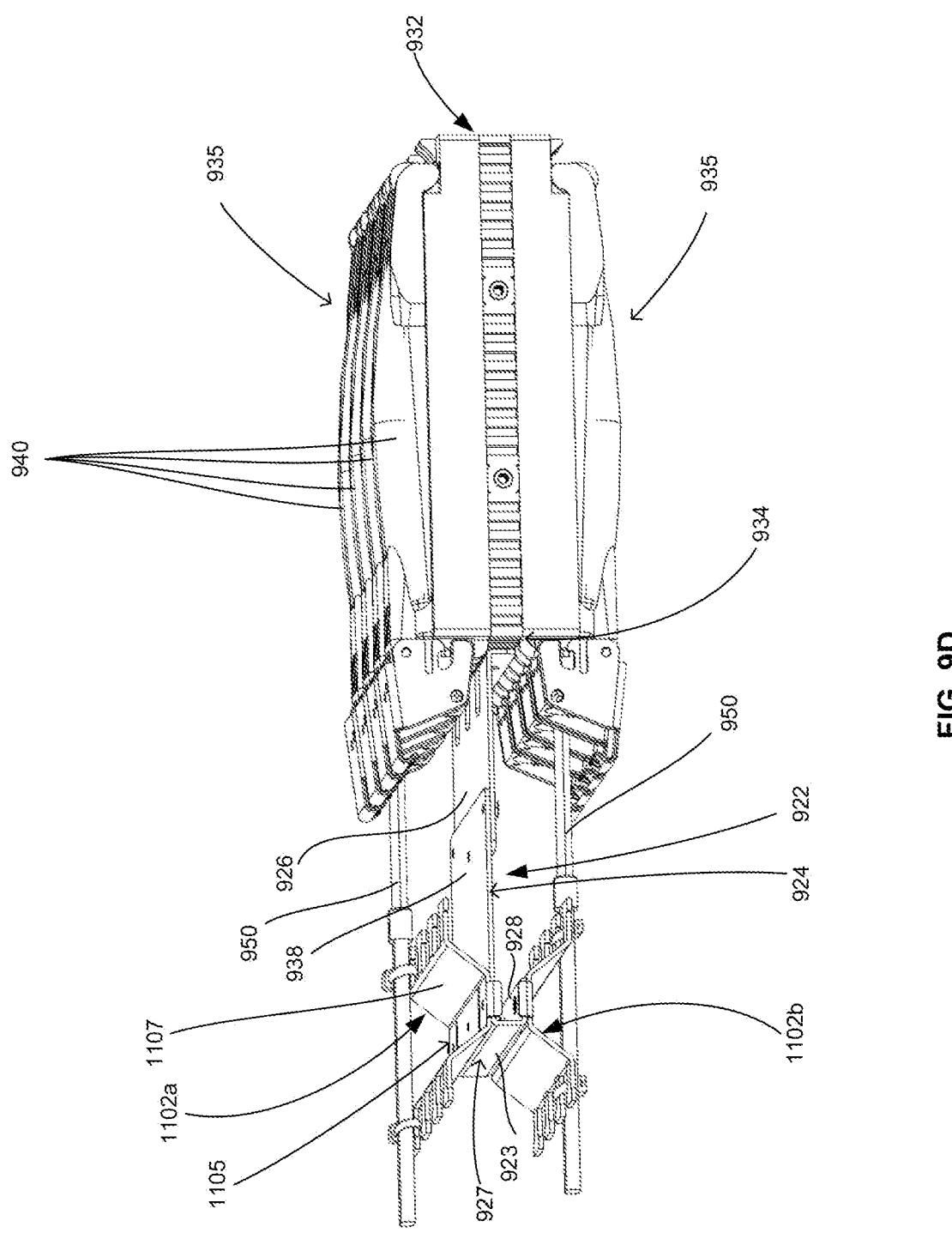
FIGS. 9D and 9E are a perspective views of the cable enclosure of FIGS. 9A-9C with an external anchor according to aspects of the disclosure.
Figure 9E:
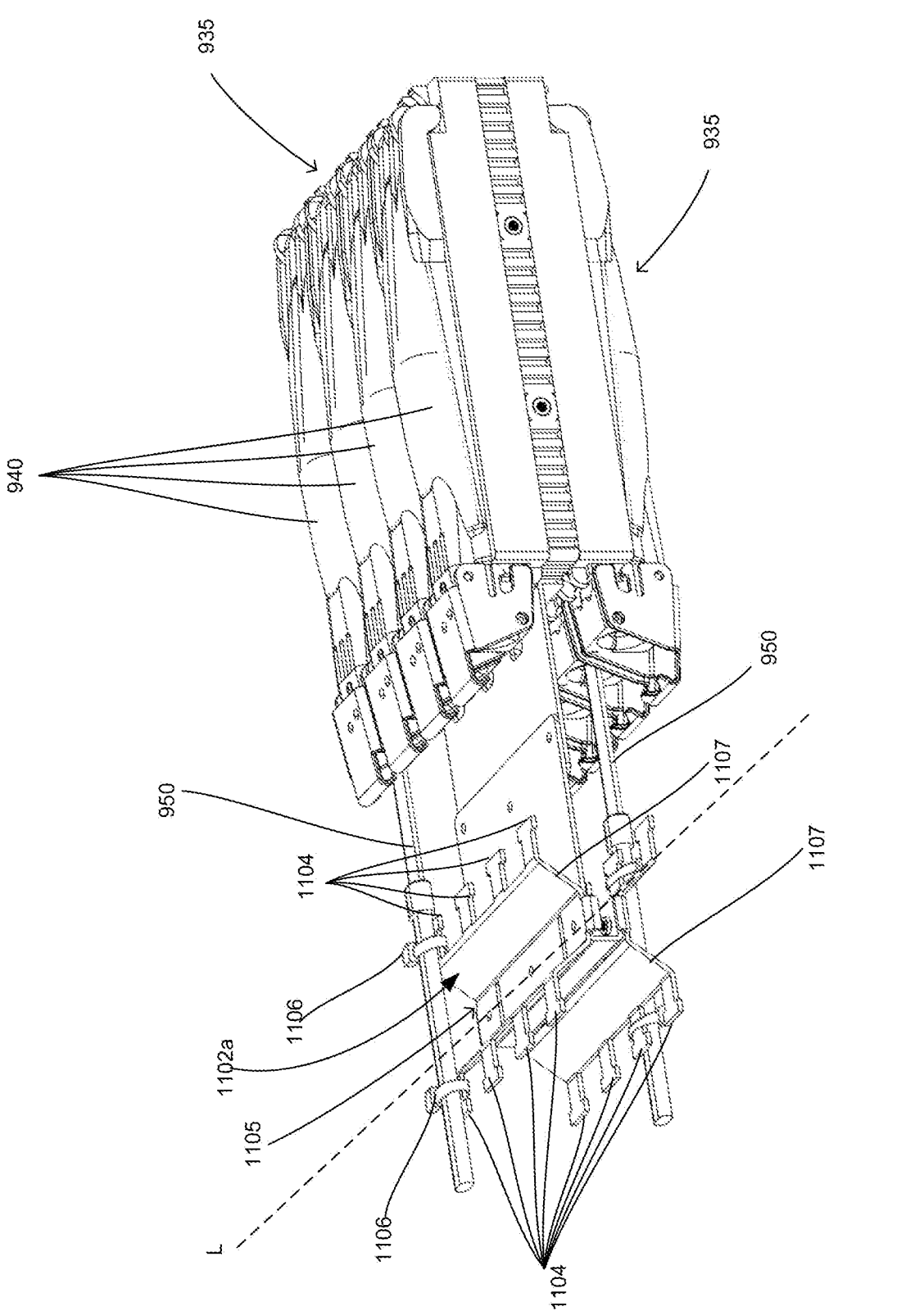

FIGS. 9D and 9E illustrate a support structure for cables 950 connected to multi-cable terminals 935. The support structure 922 may include one or more extension plates 926, 924 and one or more external anchors 1102.

Extension plate 926 may be coupled to and extend away from a first end 934 of housing 932. For example, extension plate 936 may be removably coupled to housing 932 via screws or may be coupled to housing 932 via rivets, solder, etc.

Extension plate 924 may be coupled to extension plate 926. Extension plate 924 may extend away from first end 934 of housing 932. Extension plate 924 may include a "U"-shaped portion 923 at a first end 927 of extension plate 924. The "U"-shaped portion 923 may loop, or bend, back towards the first end 934 of housing 932 such that a first portion 938 of extension plate 924 extends away from the first end of housing 932 and a second portion 928 of extension plate 924 extends towards the first end 934 of housing 932. First portion 938 and may be parallel or substantially parallel to second portion 928.

While extension plate 926 and extension plate 924 are illustrated as two separate plates, extension plates 924, 926 may be integral such that there is only a single extension plate. In some examples, there may be more than two extension plates. Therefore, having two extension plates 924, 926 is merely one example and is not intended to be limiting.

One or more external anchors 1102 may be removably coupled to extension plate 924. For example, a first external anchor 1102*a* may be removably coupled to the first portion 928 of extension plate 924 and a second external anchor 1102*b* may be removably coupled to the second portion 938 of extension plate 924. The external anchors may be configured to provide additional support for cables 950. The additional support provided by external anchors 1102 may prevent cables 950 from being pulled out of sub-structures 940 of multi-cable terminals 935. Additionally or alternatively, by connecting cables 950 to external anchors 1102, external anchors 1102 may prevent cables 950 from being pulled in a direction transverse to the longitudinal axis of housing 932. By preventing cables 950 from being pulled out of sub-structures 940 or in a direction transverse to the housing 932, external anchors 1102 may prevent damage to cable 950 and/or a disruption in connectivity of the service provided via cables 950.

External anchors 1102 may be removably connected or coupled to a respective portion of extension plate 924. For example, external anchor 1102*a* may be connected to first portion 938 of extension plate 924 and external anchor 1102*b* may be connected to second portion 928 of extension plate 924. External anchors 1102 may be connected to extension plate 924 via known connection means, such as a zip-tie, hook-and-loop, twist tie, screws, solder joint, etc. In some examples, external anchors 1102 may be crimped to extension plate 924.

Figure 10A:
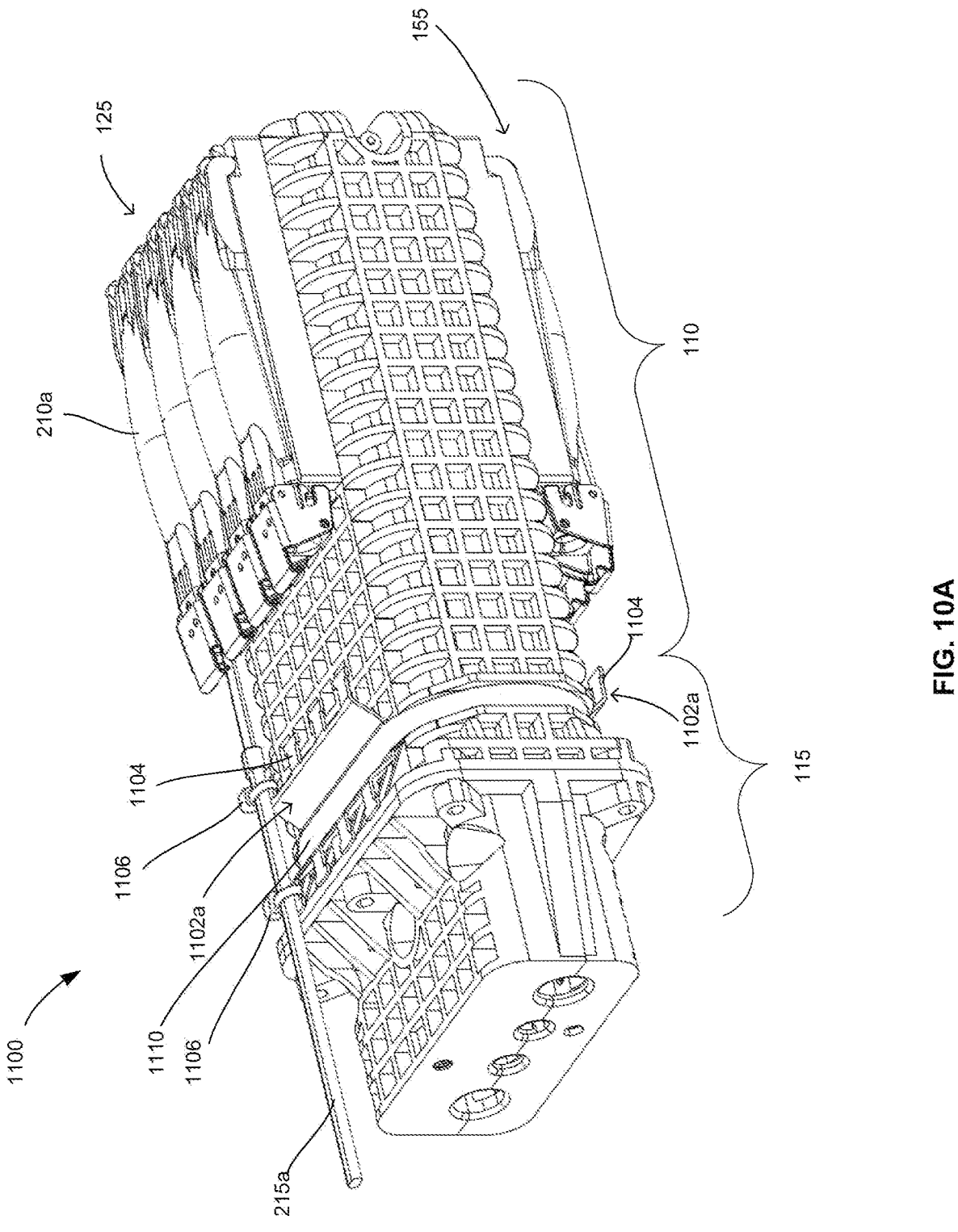
FIG. 10A is a perspective view of a cable enclosure with an external anchor according to aspects of the disclosure.

FIG. 10A illustrates an example cable enclosure 1100. Cable enclosure 1100 may be similar to cable enclosures 100, 150, 200, 300, 400, and 700 but may further include an external anchor 1002. As shown, cable enclosure 1100 may include two external anchors 1102*a*, 1102*b*, one on each side of cable enclosure 1100. The number of external anchors 1102 may correspond to the number of multi-cable terminals 125, 155. For example, external anchor 1002*a* may be used to support service cables extending from multi-cable terminal 125 while external anchor 1002*b* may be used to support service cables extending from multi-cable terminal 155.

External anchor 1102 may be configured to provide additional support for service cables 215*a*, 215*b'*, and 215*b''* after service cables 215*a*, 215*b'*, and 215*b''* leave sub-structures 210*a*, 210*b* and are routed away from sub-sub-structures 210*a*, 210*b*. According to some examples, by connecting service cables 215*a*, 215*b'*, and 215*b''* to external anchor 1002, external anchor 1002 may prevent service cables 215*a*, 215*b'*, and 215*b''* from being pulled out of sub-structure 210*a* of multi-cable terminal 125. Additionally or alternatively, by connecting service cables 215*a*, 215*b'*, and 215*b''* to external anchor 1102, external anchor 1102 may prevent service cables 215*a*, 215*b'*, and 215*b''* from being pulled in a direction transverse to the longitudinal axis of cable enclosure 1100. By preventing service cables 215*a*, 215*b'*, and 215*b''* from being pulled out of sub-structure 210*a* or in a direction transverse to cable enclosure 110, external anchor 1102 may prevent damage to service cables 215*a*, 215*b'*, and 215*b''* and/or a distribution in connectivity of the service provided via service cables a, 215*b'*, and 215*b''*.

Figure 10B:
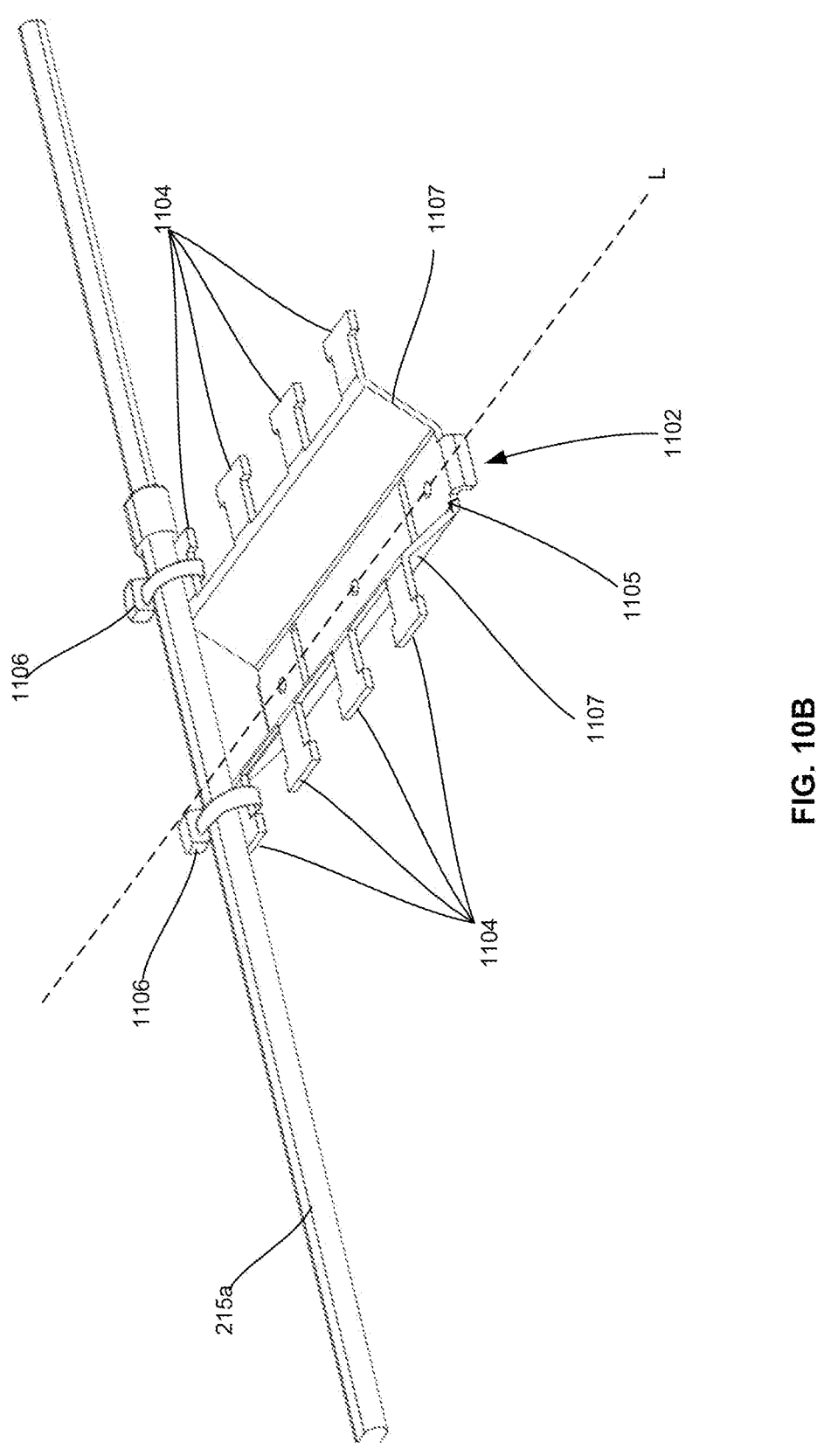
FIG. 10B is a perspective view of the external anchor of FIG. 11A according to aspects of the disclosure.

As shown in FIG. 10B, external anchor 1002 may have a plurality of anchor portions 1004 extending from base 1105. According to some examples, walls 1107 may extend between base 1105 and anchor portions 1104. Walls 1107 may extend from base 1105 at an angle transverse to the longitudinal axis "L" of base 1105. According to some examples, two walls 1107 may extend outwardly from base 1105 in opposing directions such that walls 1107 make a "v" or "u" shape with base 1105.

Anchor portions 1104 may be the portion of external anchor 1102 in which service cables 215*a*, 215*b'*, and 215*b''* are coupled to external anchor 1102. In some examples, anchor portions extend parallel, or substantially parallel, to base 1105. Service cables a, 215*b'*, and 215*b''* may be connected to a respective anchor portion 1004 by any known connection means 1006. As shown, the connection means 1106 may be a zip-tie. However, connection means 1006 may be a cable-tie, hook-and-loop, twist-tie, etc.

External anchor 1102 may be removably connected or coupled to cable enclosure 1100 via connection means 1110. Similar to connection means 1106, connection means 1110 may be a zip-tie, hook-and-loop, twist-tie, or any other known connection means to connect external anchor 1102 to cable enclosure 1100. For example, while connection means 1110 is shown as something that goes around the outside of cable enclosure 1100, connection means 1110 may be a solder joint or screw used to connect external anchor 1102 to cable enclosure 1100.

Embodiments of the present technology include, but are not restricted to, the following.

A cable enclosure including a main portion; a multi-cable terminal secured to the main portion; and a sealing assembly for accommodating at least one cable portion and for providing a watertight seal between the sealing assembly and the at least one cable portion and between the sealing assembly and the main portion.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A cable enclosure comprising:
a main portion;
at least one multi-cable terminal secured to the main portion comprising at least one sub-structure configured to receive a service cable; and
a sealing assembly for accommodating at least one cable portion and for providing a watertight seal between the sealing assembly and the at least one cable portion and between the sealing assembly and the main portion, wherein the at least one sub-structure includes:
one or more cable connection elements;
a cable seal positioned within the at least one sub-structure;
a base; and
a lid configured to close against the base.

2. The cable enclosure of claim 1, wherein when the service cable is within the at least one sub-structure and the lid is closed against the base, the cable seal provides a watertight seal around one or more connection elements.

3. The cable enclosure of claim 1, wherein the at least one sub-structure includes a port sealer configured to provide a watertight seal between the at least one sub-structure and the main portion.

4. The cable enclosure of claim 1, wherein the sealing assembly includes at least one gasket for providing the watertight seal between the sealing assembly and the main portion.

5. The cable enclosure of claim 4, wherein the sealing assembly includes a first half having a first gasket and a second half having a second gasket, wherein the first half and second half are each configured to be coupled to the main portion.

6. The cable enclosure of claim 4, wherein the sealing assembly further includes an inwardly protruding portion configured to protrude into the main portion when the sealing assembly is coupled to the main portion.

7. The cable enclosure of claim 6, wherein the at least one gasket is in contact with a perimeter of the inwardly protruding portion.

8. The cable enclosure of claim 1, wherein the main portion includes:

a slack tray configured to house a portion of the at least one cable portion;

a splice tray atop the slack tray; and a separator configured to house at least a portion of an intermediate cable, wherein one or more fibers from the at least one cable portion are spliced to one or more fibers from the intermediate cable at the splice tray.

9. The cable enclosure of claim 8, wherein the slack tray is positioned between the splice tray and the separator.

10. The cable enclosure of claim 8, further comprising an option module.

11. The cable enclosure of claim 10, wherein the option module is coupled to the splice tray.

12. The cable enclosure of claim 1, further comprising an external anchor secured to the main portion.

13. The cable enclosure of claim 12, wherein at least one service cable is configured to extend from the multi-cable terminal to the external anchor.

14. The cable enclosure of claim 13, wherein the at least one service cable is removably connected to the external anchor.

15. A cable enclosure comprising:

a main portion;

at least one multi-cable terminal secured to the main portion; and a sealing assembly for accommodating at least one cable portion and for providing a watertight seal between the sealing assembly and the at least one cable portion and between the sealing assembly and the main portion, wherein the sealing assembly includes:

at least one gasket for providing the watertight seal between the sealing assembly and the main portion, and an inwardly protruding portion configured to protrude into the main portion when the sealing assembly is coupled to the main portion.

\* \* \* \* \*